United States Patent
Nishtala

(10) Patent No.: US 8,689,017 B2
(45) Date of Patent: Apr. 1, 2014

(54) SERVER POWER MANAGER AND METHOD FOR DYNAMICALLY MANAGING SERVER POWER CONSUMPTION

(75) Inventor: Satyanarayana Nishtala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 12/634,367

(22) Filed: Dec. 9, 2009

(65) Prior Publication Data

US 2010/0235662 A1 Sep. 16, 2010

Related U.S. Application Data

(60) Provisional application No. 61/159,617, filed on Mar. 12, 2009.

(51) Int. Cl.
 *G06F 1/32* (2006.01)
(52) U.S. Cl.
 USPC ............................. 713/300; 713/320; 713/324
(58) Field of Classification Search
 USPC .......................................... 713/300, 320, 324
 See application file for complete search history.

(56) References Cited

U.S. PATENT DOCUMENTS

| | | | | |
|---|---|---|---|---|
| 5,928,365 | A * | 7/1999 | Yoshida ......................... | 713/324 |
| 7,457,970 | B2 * | 11/2008 | Alba Pinto et al. ........... | 713/300 |
| 7,523,282 | B1 * | 4/2009 | Kapil et al. .................... | 711/167 |
| 7,702,940 | B2 * | 4/2010 | Van Gassel et al. .......... | 713/324 |
| 2006/0136761 | A1 * | 6/2006 | Frasier et al. ................. | 713/320 |
| 2006/0206738 | A1 * | 9/2006 | Jeddeloh et al. .............. | 713/320 |
| 2007/0033425 | A1 * | 2/2007 | Clark ............................. | 713/320 |
| 2008/0162966 | A1 * | 7/2008 | Krause et al. ................. | 713/322 |
| 2009/0070612 | A1 * | 3/2009 | Adelman et al. .............. | 713/322 |
| 2009/0249094 | A1 * | 10/2009 | Marshall et al. .............. | 713/320 |
| 2010/0037038 | A1 * | 2/2010 | Bieswanger et al. ......... | 712/220 |
| 2010/0100696 | A1 * | 4/2010 | Suzuki .......................... | 711/162 |
| 2010/0131724 | A1 * | 5/2010 | Miura et al. .................. | 711/154 |
| 2010/0299465 | A1 * | 11/2010 | Arndt et al. ................... | 710/104 |
| 2010/0332883 | A1 * | 12/2010 | Saxe et al. ..................... | 713/324 |
| 2011/0022857 | A1 * | 1/2011 | Nussbaum et al. ........... | 713/300 |

* cited by examiner

*Primary Examiner* — Vincent Tran

(74) *Attorney, Agent, or Firm* — Schwegman Lundberg & Woessner, P.A.

(57) ABSTRACT

A server power manager and method for dynamic server power management are generally described herein. The server power manager is configured to implement one or more server management policies that identify target server power consumption and/or target functionality for the server system. The server power manager determines an amount of excess processing capability and/or an amount of excess physical memory based on the target server power consumption and the target functionality. The server power manager may transition a processor core to a lower-operational state when at least a predetermined amount of excess processing capability is determined while maintaining server system functionality. The server power manager may transition a memory module to a lower-operational state when at least a predetermined amount of excess physical memory is determined while maintaining the server system functionality.

17 Claims, 5 Drawing Sheets

SERVER POWER MANAGER AND METHOD FOR DYNAMICALLY MANAGING SERVER POWER CONSUMPTION

CROSS-REFERENCE TO RELATED APPLICATION

This non-provisional patent application claims the benefit of the filing date of U.S. Provisional Patent Application Ser. No. 61/159,617; filed Mar. 12, 2009; and entitled, "SERVER POWER MANAGER AND METHOD FOR DYNAMICALLY MANAGING SERVER POWER CONSUMPTION," the content of which is incorporated by reference herein.

TECHNICAL FIELD

Example embodiments pertain to server systems and server power management. Some example embodiments pertain to managing power consumption in server systems and in data centers.

BACKGROUND

Managing power consumption and power dissipation of server systems is a major issue for the server industry, particularly due to increasing energy costs and environmental hazards associated with energy consumption. Due to the need to support short-duration, higher-demand periods, many data centers deploy over-configured or higher-performance server systems. Many data centers are therefore underutilized much of the time and operate at much lower performance demands than those for which they are configured. Many data centers also deploy over-configured or higher-performance server systems to simplify procurement and deployment logistics by using a common higher-performance server configuration.

OVERVIEW

In example embodiments, a server power manager operates within a server system that includes a plurality of multi-core processors and a plurality of memory modules. In these embodiments, the server power manager is configured to implement one or more server management policies that identify target server power consumption and/or target functionality for the server system. The server power manager is also configured to determine at least one of an amount of excess processing capability and an amount of excess physical memory based on the target server power consumption and the target functionality. The server power manager is also configured to transition at least one of the processor cores to a lower-operational state when at least a predetermined amount of excess processing capability is determined while maintaining server system functionality during the transition. The server power manager is also configured to transition at least one of the memory modules to a lower-operational state when at least a predetermined amount of excess physical memory is determined while maintaining the server system functionality during the transition.

DETAILED DESCRIPTION

Figure 1:
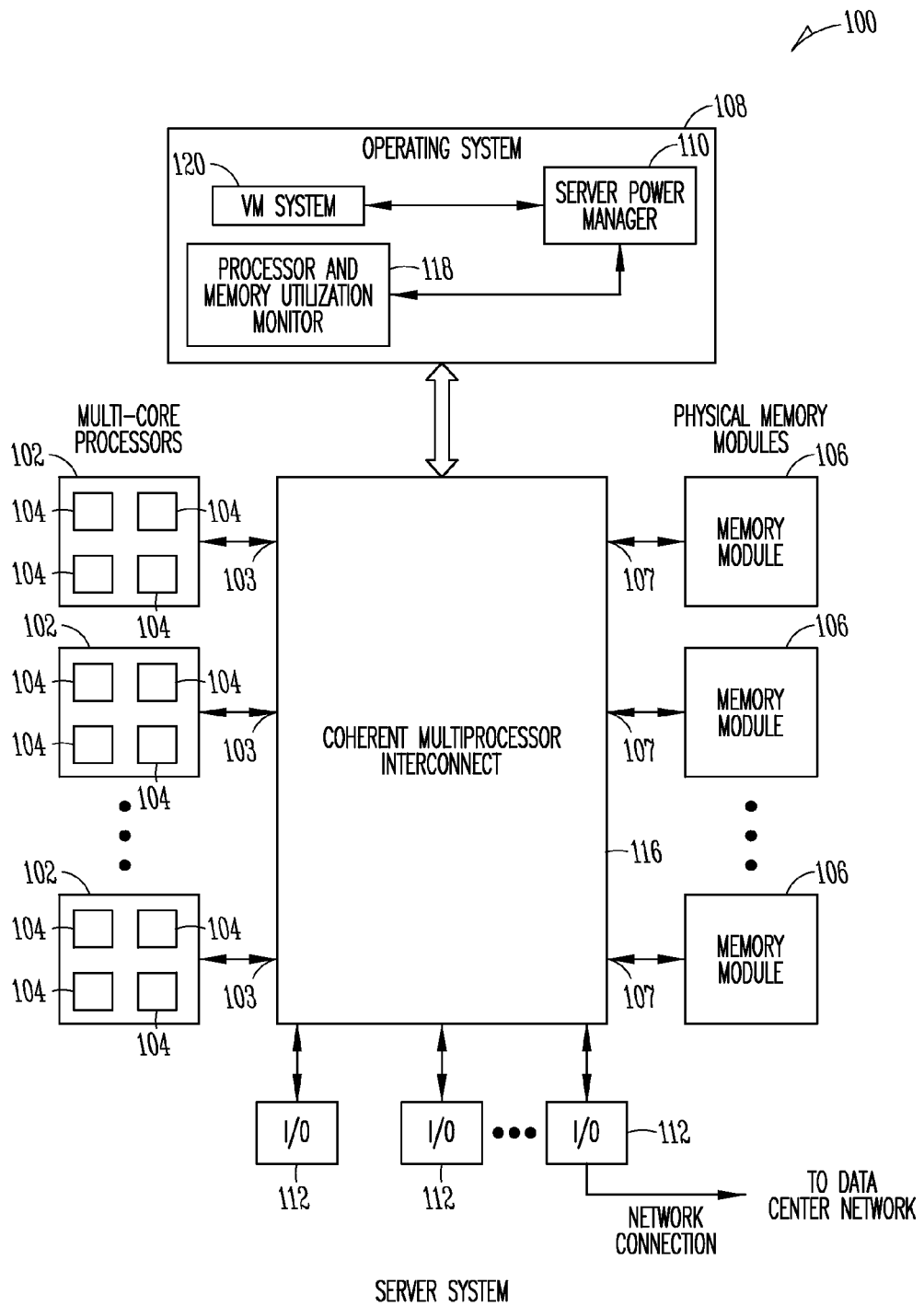
FIG. 1 is a block diagram of a server system, in accordance with some example embodiments.

FIG. 1 is a block diagram of a server system 100, in accordance with some example embodiments. The server system 100 includes multi-core processors 102 and a plurality of memory modules 106. Each of the multi-core processors 102 may include two or more processor cores 104. The server system 100 also includes a coherent multiprocessor interconnect 116 coupled to each of the multi-core processors 102 through a plurality of multi-core processor sockets 103. The coherent multiprocessor interconnect 116 is also coupled to the memory modules 106 through a plurality of memory module sockets 107. The server system 100 also includes an operating system 108 to operate various processes and configure the server system 100 to perform various operations as described in more detail below. The server system 100 also includes input/output (I/O) modules 112 coupled to the coherent multiprocessor interconnect 116 to provide I/O functionality for the server system 100. The server system 100 may operate as a stand-alone server or may operate as a single server in a data center that includes many server systems.

In accordance with example embodiments, the operating system 108 may include a server power manager 110 operating thereon and configured to manage the power consumption of the server system 100. The operating system 108 may also include a processor and memory utilization monitor 118 operating thereon to monitor processor usage and memory usage. The operating system 108 may also include a virtual memory (VM) system 120 operating thereon to manage memory-related operations. The server power manager 110 and/or the processor and memory utilization monitor 118 may include applications that operate on the operating system 108, although the scope of the example embodiments is not limited in this respect. In some alternate example embodiments, the server power manager 110 and/or the processor and memory utilization monitor 118 may be separate functional elements from the operating system 108.

The server system 100 may be configured to host a number of virtual machines under the control of a virtual machine management system, such as a virtual machine monitor (VMM), sometimes referred to as a Hypervisor. In these example embodiments, the server power manager 110 and/or the processor and memory utilization monitor 118 may operate within the VMM or Hypervisor, although this is not a requirement.

The server power manager 110 may determine an amount of excess processing capability and an amount of excess physical memory based on target server power consumption. The server power manager 110 may also transition one or more processor cores 104 and one or more memory modules 106 to a lower-operational state while retaining functionality of the server system 100 based on the determined amounts. In these example embodiments, the server power manager 110 may select and logically disable one or more of the processor cores 104 and one or more of the memory modules 106 without impacting the functionality of the server system 100 that may be needed for current demands. In these example embodiments, the selected processor cores 104 and selected memory modules 106 may be transitioned to a lower-power functionally-active state (e.g., a lower-operational state). This transitioning process is described by way of example in more detail below. In some example embodiments, selected processor cores 104 and/or selected memory modules 106 may be logically disabled.

A lower-operational state for one of processor cores 104 may be a lower-power functionally-active state that may be induced by slower clock signals and/or reduced voltage levels. A fully-operational state may be a higher-power functionally-active state in which one of processor cores 104 is configured for higher-level performance. A lower-operational state for one of memory modules 106 may include a lower-power state induced by the disabling of clock signals, may include an auto-refresh mode or may include a deep-sleep state. During the lower-operational state, one of memory modules 106 may be logically disabled. A fully-operational state may include a state in which one of memory modules 106 is operational and is conventionally operated.

The server power manager 110 may manage server power consumption based on one or more server management policies that may be implemented by a data center management system. The target server power consumption may relate to one or more server management policies, although the scope of the example embodiments is not limited in this respect. One or more of the I/O modules 112 may provide network connectivity to a data center that includes the data center management system. The server power manager 110 may configure the operating system 108 to reduce the power consumption of the server system 100 in response to a policy-based request from the data center.

The server power manager 110 may select individual processor cores 104 to transition to a lower-operational state based on the amount of excess processing capability that the server power manager 110 has determined. The server power manager 110 may also select individual memory modules 106 to transition to a lower-operational state based on the amount of excess physical memory that the server power manager 110 has determined. In order to retain functionality, in an example embodiment the number of the processor cores 104 selected by the server power manager 110 to transition to the lower-operational state is less than the total number of the processor cores 104 in the server system 100. In order to retain functionality, in an example embodiment the number of the memory modules 106 selected by the server power manager 110 to transition to the lower-operational state is less than the total number of the memory modules 106 in the server system 100. The server system 100 may perform server operations using the processor cores 104 and the memory modules 106 that remain fully and partially operational after the selected processor cores 104 and the memory modules 106 are transitioned to a lower-operational state. In some example embodiments, the processor cores 104 and the memory modules 106 may remain partially operational while in a lower-operational state. In some example embodiments, the processor cores 104 and the memory modules 106 may be logically powered down to minimize the server power consumption.

The server power manager 110 may migrate or transition processes away from the selected processor cores 104 and may refrain from scheduling further processes to logically disable one or more of the selected processor cores 104 while retaining functionality. The server power manager 110 may also flush cache hierarchy and translation lookaside buffers (TLBs) of the selected processor cores 104. The server power manager 110 may also ensure that the selected processor cores 104 are not a target of system interrupts and may transition the selected processor cores 104 to a lower-operational state. The operating system 108 may be configured to determine which of the processor cores 104 are targets of system interrupts and may ensure that these selected processor cores 104 are not the targets of these system interrupts.

In some example embodiments, all the processor cores 104 in a single one of the multi-core processor sockets 103 may be transitioned to a lower-power functionally-active state (e.g., a lower-operational state). The processor cores 104 that are transitioned to a lower-power functionally-active state are not necessarily logically disabled. During a lower-power functionally-active state, the server power manager 110 may disable clock signals to the selected processor cores 104. Portions of the selected processor cores 104 may be powered down after deactivation. In other example embodiments, the selected processor cores 104 may be provided a slower clock signal and/or a lower voltage level. In these example embodiments, the selected processor cores 104 are logically isolated before they are disabled or powered down.

To logically disable the selected memory modules 106 while retaining functionality, the server power manager 110 may request the VM system 120 to reserve the determined amount of physical memory and to declare the physical memory address space corresponding with the determined amount of physical memory unavailable to the VM system 120. The memory modules 106 corresponding to the reserved physical memory address space may then be transitioned to a lower-operational state. The VM system 120 may swap out contents of the requested memory space to a disk system. A balloon driver may be used to logically reserve the determined amount of physical memory in virtual memory space.

As mentioned above, the server system 100 may be configured to host a number of virtual machines under the control of a VMM or Hypervisor. The server power manager 110 may request the VMM to reserve the physical memory address space instead of requesting that the operating system 108 reserve the physical memory address space. The server power manager 110 may declare the corresponding physical memory space to be unavailable to the VMM and may transition the corresponding memory modules 106 to a lower power or powered-down state.

The server power manager 110 may disable clock signals to the selected memory modules 106 during a lower-operational state. Alternately, the server power manager 110 may instruct the selected memory modules 106 to enter an auto-refresh state during a lower-operational state. The selected memory modules 106 may also or alternatively be transitioned to a deep-sleep state to provide additional power reduction.

The server power manager 110 may access processor utilization information and memory utilization information from the processor and memory utilization monitor 118 to determine the amount of excess processing capability and the amount of excess physical memory. The processor and memory utilization monitor 118 may monitor both processor utilization and memory utilization and may be implemented by the operating system 108.

In some alternate example embodiments, at least one of the processor cores 104 of each of the multi-core processors 102 may be selected to remain active. In an example embodiment, each of the multi-core processor sockets 103 are configured have one fully active processor core 104 while the other processor cores 104 of the associated multi-core processor sockets 103 are in a lower-operational state.

The server power manager 110 may receive a request from a data center management system to either partially restore or fully restore the functionality of the server system 100. In response to the request, the server power manager 110 may transition the processor cores 104 that are in a lower-operational state to a fully-operational state. In response to the request, the server power manager 110 may also transition the memory modules 106 that are in a lower-operational state to a fully-operational state.

When the server power manager 110 transitions the selected processor cores 104 to the fully operational-state, the server power manager 110 may inform the operating system 108 to indicate an availability of the selected processor cores 104 after the selected processor cores 104 are powered up. The server power manager 110 may update processor tables of the operating system 108. When the server power manager 110 transitions the selected memory modules 106 to a fully-operational state, the server power manager 110 may inform the VM system 120 that the address space associated with the selected memory modules 106 is now available.

A request from a data center management system to the server system 100 to reduce power consumption or to either partially restore or fully restore system performance may be in the form of a timer interrupt, a network packet, or a message directed to the server power manager 110. These requests may be based on one or more server management policies that are implemented by the data center management system.

In some alternate example embodiments, the server power manager 110 may select a number of the processor cores 104 and a number of the memory modules 106 to transition to a lower-operational state based on a current or anticipated activity of the server system 100 or anticipated performance needs of the server system 100. When at least some the processor cores 104 and the memory modules 106 are in a lower-operational state or deactivated, the server power manager 110 may determine a number of inactive processor cores 104 and a number of inactive memory modules 106 to activate when the server system 100 activity begins approaching the current or anticipated activity. The server power manager 110 may then transition the determined number of processor cores 104 and memory modules 106 to an active state. When at least some the processor cores 104 and memory modules 106 are in a lower-operational state or deactivated, the server power manager 110 may also determine a number of inactive processor cores 104 and a number of inactive memory modules 106 to activate when the server system 100 activity begins approaching the system capability. Accordingly, the server power manager 110 may provide for significant power consumption reduction in the server system 100.

The memory modules 106 may be dual-inline memory modules (DIMMs), although the scope of the example embodiments is not limited in this respect. The memory modules 106 may include dynamic random access memory (DRAM), including double data rate (DDR) synchronous dynamic random access memory (SDRAM), including DDR1, DDR2 and DDR3 SDRAM. The memory modules 106 may interface with one or more memory controllers (not separately illustrated), which may interface with coherent multiprocessor interconnect 116. The memory controllers may be functionally implemented by one or more of the processor cores 104.

Although the operating system 108 is illustrated as having several separate functional elements, one or more of the functional elements may be combined and implemented by combinations of software-configured elements, such as processing elements including digital signal processors (DSPs) and/or other hardware elements. Some functional elements of the operating system 108 may include one or more microprocessors, DSPs, application-specific integrated circuits (ASICs) and combinations of various hardware and logic circuitry for performing at least the functions described herein. The functional elements of the operating system 108 may refer to one or more processes operating on one or more processing elements. The server power manager 110 may be embodied in software running on the operating system 108 and may be in the form of a driver. The operating system 108 may also include one or more functional elements to implement VMM and/or Hypervisor functionality.

Example embodiments may be implemented in one or a combination of hardware, firmware and software. Example embodiments may also be implemented as instructions stored on a computer-readable medium, which may be read and executed by at least one processor to perform the operations described herein. A computer-readable medium may include any tangible medium for storing or transmitting information in a form readable by a computer. For example, a computer-readable medium may include read-only memory (ROM), random-access memory (RAM), magnetic disk storage media, optical storage media, flash-memory devices, and others.

Figure 2:
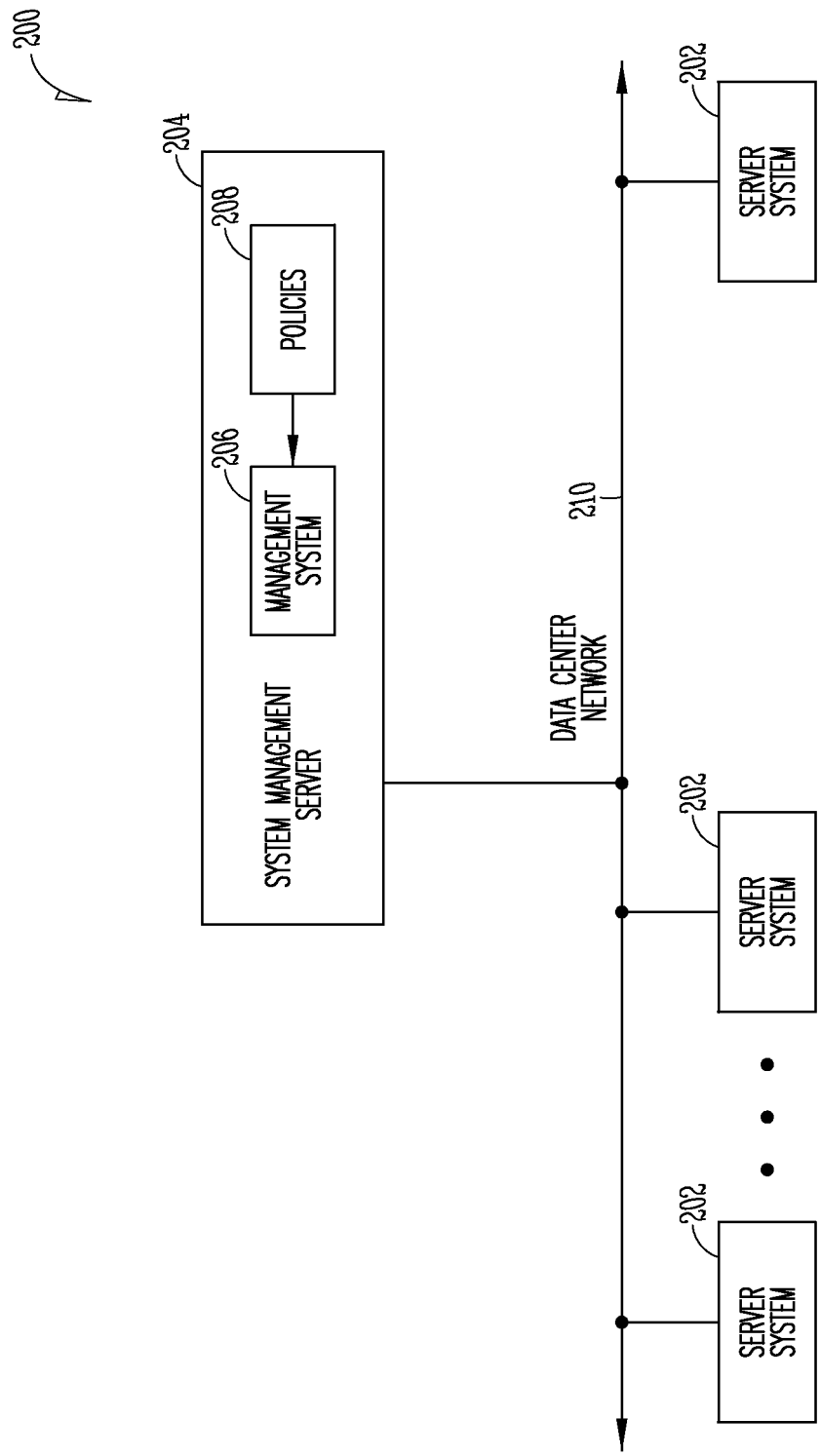
FIG. 2 illustrates a data center, in accordance with some example embodiments.

FIG. 2 illustrates a data center 200, in accordance with some example embodiments. The data center 200 includes a plurality of server systems 202, a system management server 204, and a data center network 210. The data center network 210 couples the server systems 202 with the system management server 204. The server system 100 (FIG. 1) may be suitable for use as any one or more of the server systems 202. FIG. 2 shows the logical network between the system management server 204 and the plurality of server systems 202. The physical network implementation may be based on a number of data center requirements, including a number of network switches or routers, and may be multi-tiered.

The system management server 204 includes a data center management system 206 to implement server management policies 208. The data center management system 206 may be hosted by the system management server 204. The data center management system 206 may send requests to a server power manager, such as the server power manager 110 (FIG. 1), to reduce the server power consumption of one of the server systems 202. The requests may be based on the server management policies 208. The server power manager 110 (FIG. 1) may determine target server power consumption based on the server management policies 208. The data center management system 206 may communicate with the server power manager 110 (FIG. 1) over the data center network 210. The requests sent by the data center management system 206 to a server power manager of one of the server systems 202 may include the target server power consumption.

The server management policies 208 may include a time-of-day policy in which the server power manager 110 (FIG. 1) is configured to reduce power consumption of one of the server systems 202 during one or more predetermined times. The predetermined times may be based on a daily or weekly time periods. The server management policies 208 may also include a data center power consumption reduction (e.g., minimization) policy in which the server power manager 110 (FIG. 1) is configured to reduce power consumption of one of the server systems 202 based on unused server capacity. The number of the processor cores 104 (FIG. 1) and the memory modules 106 (FIG. 1) selected to be transitioned to a lower-operational state may be based on a current and/or anticipated activity of the server system 100 (FIG. 1). The server management policies 208 may also include a data center maximum power consumption policy in which the server power manager 110 (FIG. 1) is configured to reduce power consumption of one of the server systems 202 when the power consumption of the data center 200 approaches a maximum value. In these example embodiments, the power consumption of the data center 200 may be capped at a maximum power consumption level. The server management policies 208 may also include an application response time power consumption policy in which the server power manager 110 (FIG. 1) is configured to maintain the minimum power consumption level to meet server application response times of various service level agreements.

In an example embodiment, the application of the server management policies 208 not only reduces power consumption and power dissipation, it also provides for the procurement of common server platforms (e.g., one-type-of-brick-to-buy) for achieving architectural uniformity, thereby simplifying logistics and pricing leverages. The server management policies 208 may be managed by the data center management system 206. The data center management system 206 may be hosted on a server, such as the server system 100 (FIG. 1), which is being power-managed. In some stand-alone example embodiments, the functions of the system management server 204, including the implementation of the server management policies 208 described herein, may be implemented by the server system 100 (FIG. 1).

Although the server systems 202 are illustrated in FIG. 2 as being part of the data center 200, there is no requirement that all the server systems 202 be located at the same geographic location. Any one or more of the server systems 202 may be located at geographically separate locations. In these example embodiments, the data center network 210 is not limited to a particular geographic location (e.g., a building or campus) but may provide network connectivity across geographically separate locations.

Figure 3:
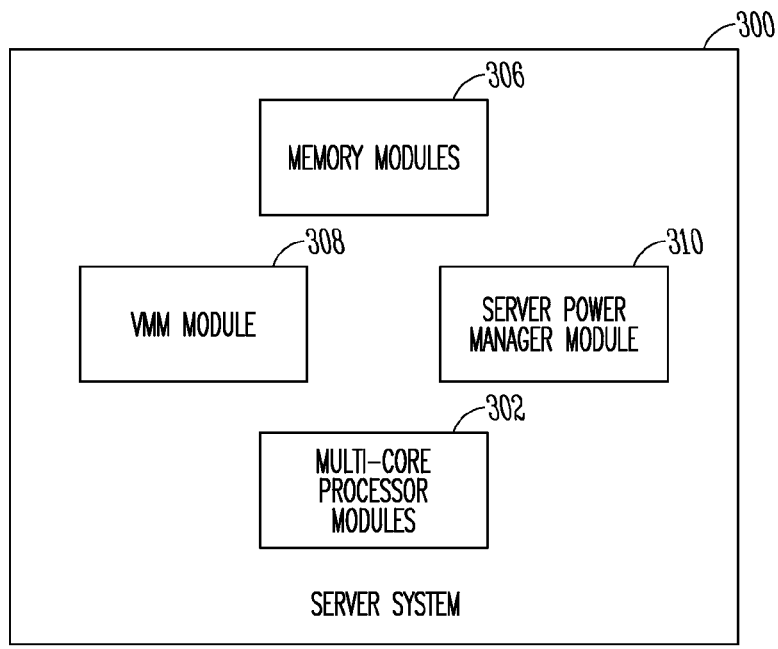
FIG. 3 is a block diagram of a server system, in accordance with some alternate example embodiments.

FIG. 3 is a block diagram of a server system 300, in accordance with some alternate example embodiments. The server system 300 includes multi-core processor modules 302, memory modules 306, a VMM module 308 and a server power manager module 310. In these example embodiments, the server power manager module 310 instructs the VMM module 308 to determine an amount of excess processing capability and physical memory based on target server power consumption. The server power manager module 310 also instructs the VMM module 308 to transition one or more of the processor cores of the multi-core processor modules 302 and one or more of the memory modules 306 to a lower-operational state while retaining functionality of the server system 300.

Figure 4:
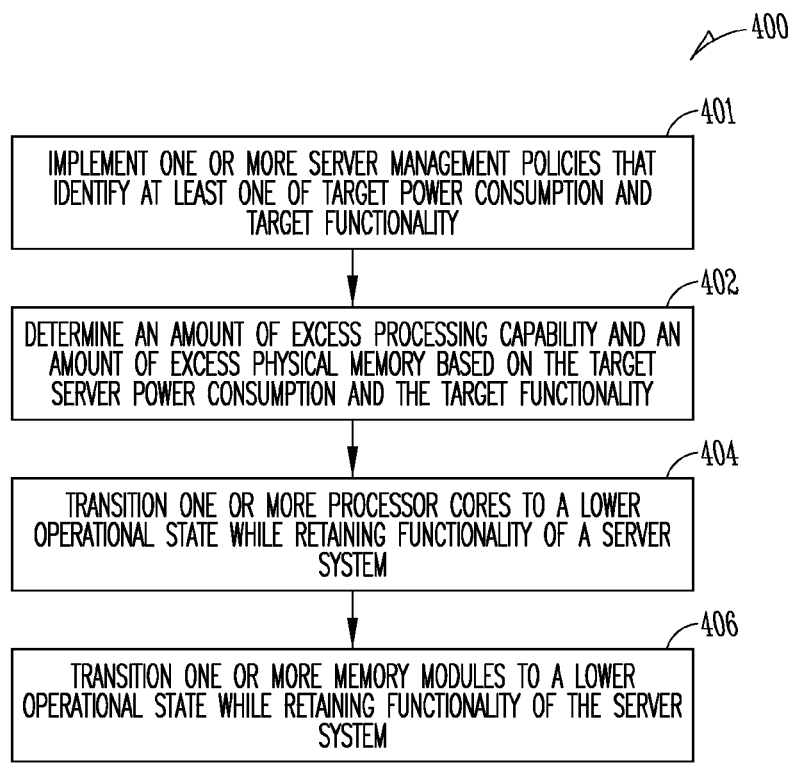
FIG. 4 is a flow chart of a server power management method, in accordance with some example embodiments.

FIG. 4 is a flow chart of a server power management method 400, in accordance with some example embodiments. The server power management method 400 may be performed by a server system, such as server system 300 (FIG. 3).

Operation 401 comprises implementing one or more server management policies that identify at least one of target server power consumption and target functionality for the server system.

In operation 402, an amount of excess processing capability and/or an amount of excess physical memory is determined. The amount may be based on target server power consumption, although this is not a requirement.

In operation 404, one or more processor cores are transitioned to a lower-operational state when at least a predetermined amount of excess processing capability is determined while retaining the functionality of the server system.

In operation 406, one or more memory modules are transitioned to a lower-operational state when at least a predetermined amount of excess physical memory is determined while retaining the functionality of the server system.

Figure 5:
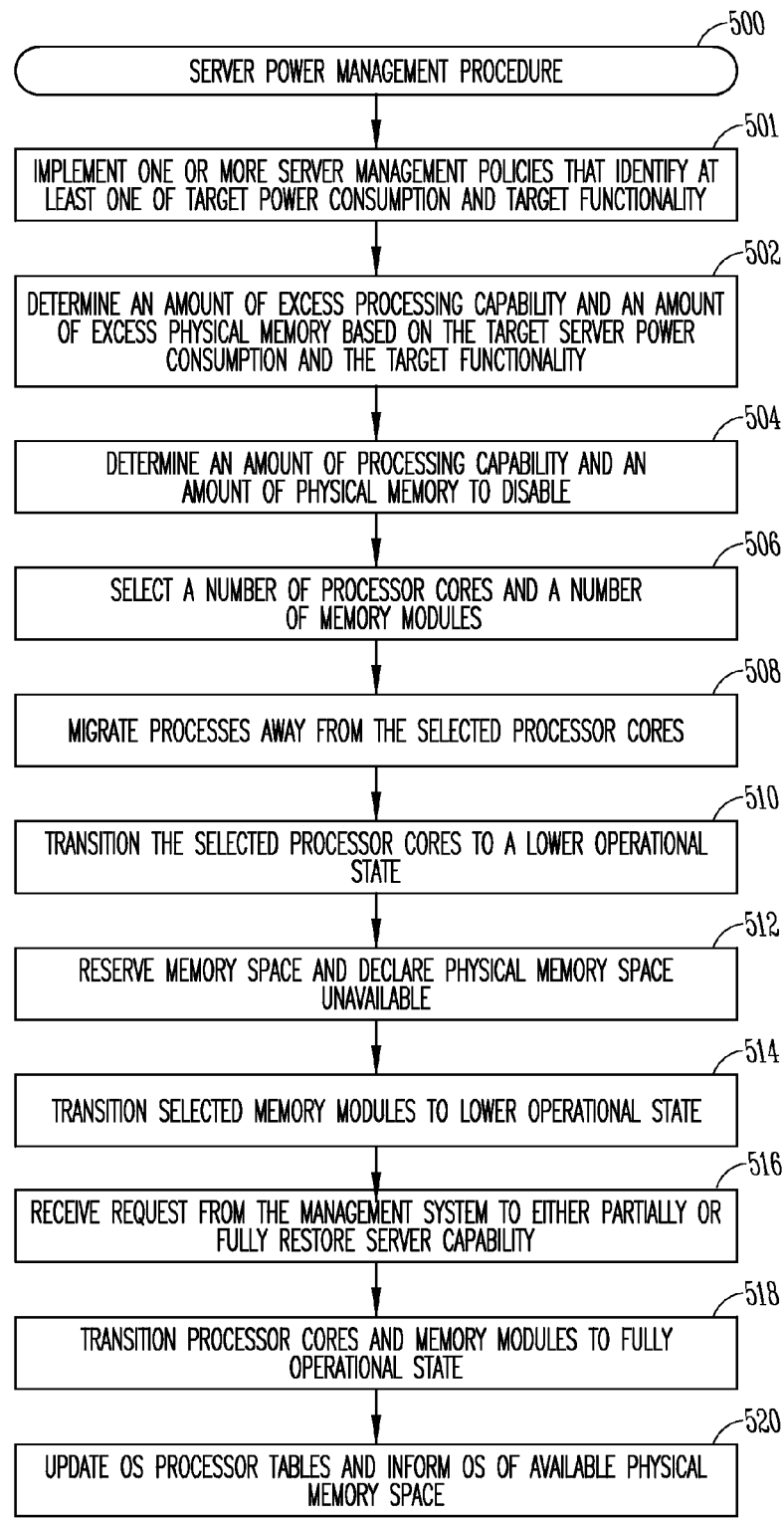
FIG. 5 is a flow chart of a server power management method, in accordance with some alternate example embodiments.

FIG. 5 is a flow chart of a server power management method 500, in accordance with some alternate example embodiments. Server power management method 500 may be performed by a server power manager, such as the server power manager 110 (FIG. 1), as part of a server system that is operating in either a stand-alone configuration or as part of a data center, such as the data center 200 (FIG. 2).

Operation 501 comprises implementing one or more server management policies that identify at least one of target server power consumption and target functionality for a server system, such as server system 100 (FIG. 1).

In operation 502, a request may be received from a data center management system to reduce server power consumption. The request may be based on, and/or may be sent in response to, one or more server management policies that may be implemented by the data center management system at the data center. In response to the request received in operation 502, operations 504 through 514 may be performed. In stand-alone example embodiments, the server power manager 110 (FIG. 1) may initiate a reduction in power consumption in response to the operations of the server power manager 110 without such a request from a data center.

In operation 504, an amount of excess processing capability and/or an amount of excess physical memory to transition is determined based on target server power consumption or unutilized server capacity. The target server power consumption may be indicated in the request from the data center management system.

In operation 506, a number of the processor cores 104 (FIG. 1) is selected and/or a number of the memory modules 106 (FIG. 1) is selected for transitioning to a lower-operational state. The number of the processor cores 104 (FIG. 1) and the number of the memory modules 106 (FIG. 1) may be determined based on the amount of excess processing capability and/or the amount of excess physical memory determined in operation 504.

In operation 508, processes may be migrated away from the selected processor cores 104 (FIG. 1). As discussed above, cache and TLBs may be flushed, and the operating system 108 (FIG. 1) may be configured to ensure that the selected processor cores 104 (FIG. 1) are not targets of system interrupts.

In operation 510, the selected processor cores 104 (FIG. 1) may be logically disabled or transitioned to a lower-operational state. Some of the processor cores 104 (FIG. 1) may be logically disabled while other processor cores 104 (FIG. 1) may be transitioned to a lower-operational state. Operation 508 does not need to be performed for the processor cores 104 (FIG. 1) that are to be transitioned to a lower-operational state (rather than being logically disabled).

In operation 512, the amount of memory space determined in operation 504 is reserved, and the physical memory space associated with the selected memory modules 106 (FIG. 1) is declared unavailable. As discussed above, the VM system 120 (FIG. 1) may be configured to swap out contents of the memory space and manage the reduction in memory space.

In operation 514, the selected memory modules 106 (FIG. 1) may be transitioned to a lower-operational state. As discussed above, the selected memory modules 106 (FIG. 1) may be powered down, the clock signals may be disabled, or the selected memory modules 106 (FIG. 1) may be instructed to enter an auto-refresh state. After the performance of operation 514, the server system 100 operates with reduced functionality.

The processor cores 104 (FIG. 1) and the memory modules 106 (FIG. 1) that are in a lower-operational state may remain in a lower-operational state until either a request is received in operation 516 or the server power manager 110 (FIG. 1) initiates a transition to either partially or fully restore functionality.

In response to operation 516, operations 518 and 520 are performed. In operation 518, one or more of the processor cores 104 (FIG. 1) and one or more of the memory modules 106 (FIG. 1) that are in a lower-operational state are transitioned to a fully-operational state. In some example embodiments, when the request received in operation 516 is to partially restore server system capability, in operation 518, one or more of the processor cores 104 (FIG. 1) and one or more of the memory modules 106 (FIG. 1) that are in a lower-operational state are transitioned to a higher-functional state that may be less than a fully-operational state.

In operation 520, processor tables of the operating system 108 (FIG. 1) may be updated to identify the now-available processor cores 104 (FIG. 1). Furthermore, as part of operation 520, the VM system 120 (FIG. 1) may be informed of the newly-available physical memory space.

Accordingly, the server power manager 110 (FIG. 1) may provide for significant power consumption reduction in the server system 100 (FIG. 1) and may utilize the hot-plug capabilities of the processor cores 104 (FIG. 1) and the memory modules 106 (FIG. 1). The hot-plug capabilities may be used to dynamically power-manage a live system by logically removing some of the processor cores 104 (FIG. 1) and some of the memory modules 106 (FIG. 1) from the server system 100 (FIG. 1) and transitioning some of the processor cores 104 (FIG. 1) and some of the memory modules 106 (FIG. 1) to a lower-operational state.

Server systems with more than one processor, such as the server system 100 (FIG. 1), may achieve more significant power savings than conventional systems that use Advanced Configuration and Power Interface (ACPI) based techniques. As the number of processor cores and the amount of physical memory in the server system 100 (FIG. 1) is increased, the impact of the power savings may become even more significant. ACPI based techniques use a number of performance/power states for the processors, the I/O devices and the system. However, the power management capabilities that can be achieved by ACPI techniques are very limited because a single set of performance states (referred to as p-states) is provided for all processors, requiring all processors in a multi-processor system to be in the same performance state. No lower-power functional states for processors or memory are provided.

Accordingly, example embodiments described herein provide for server power reduction by taking advantage of existing and emerging processor architecture capabilities and emerging functionality for hot-plug processors and hot-plug memory in next generation operating systems. The power of a server system, such as the server system 100 (FIG. 1), may be configured between a lowest architecturally viable state (e.g., a single processor core at a lowest performance state and a minimal functioning memory system) and a highest architecturally viable state (e.g., all processor cores active at full performance states and all system memory fully active). The transition time between the different performance states is a function of the difference in the number of processor cores, the amount of memory, and whether the powered-down memory is initialized and maintained in auto-refresh mode. The actual mechanisms to trigger the power configuration changes are orthogonal to this functionality and may be defined by the server management policies 208 (FIG. 2).

Figure 6:
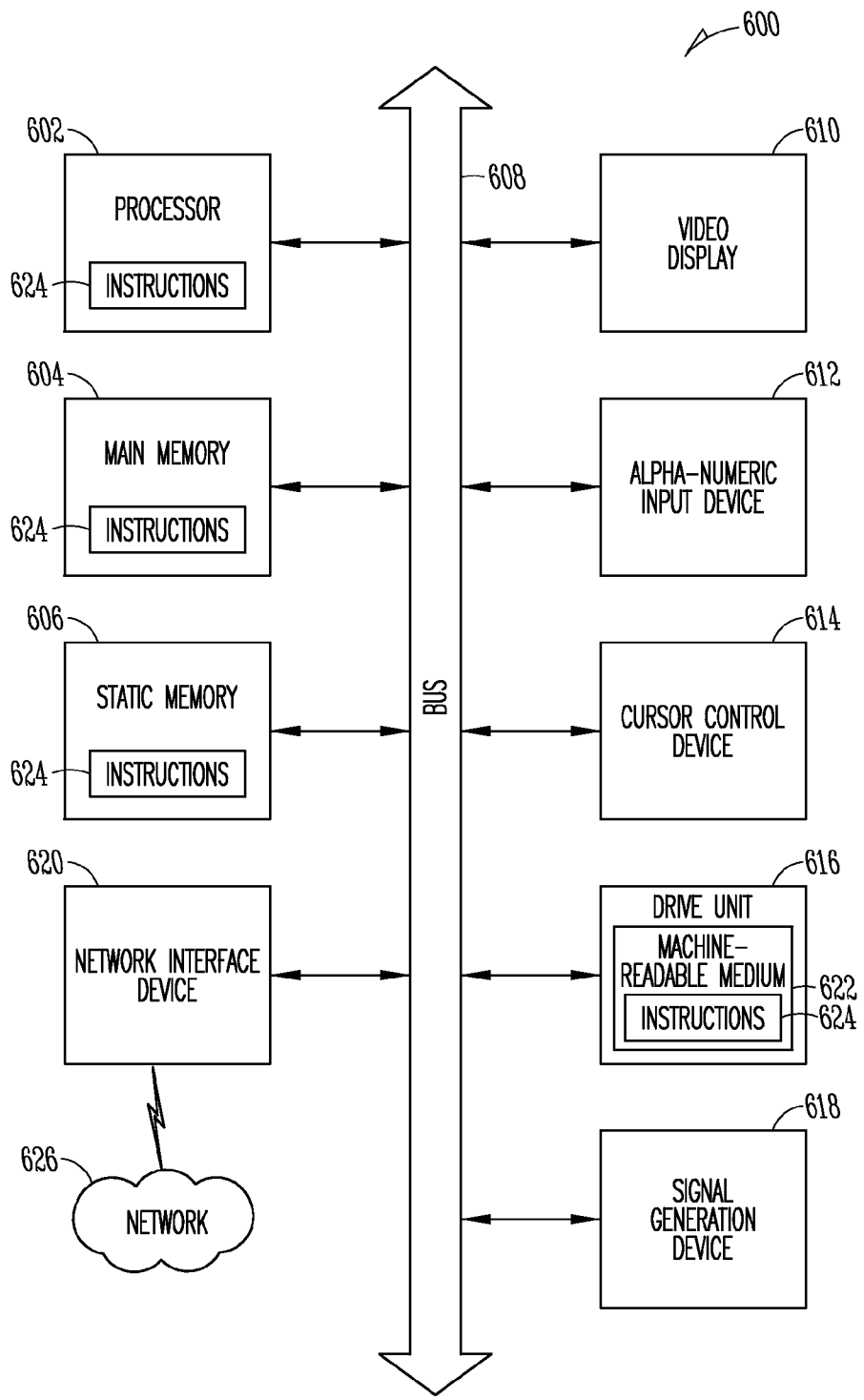
FIG. 6 is a block diagram of a computer in the example form of a processing system within which a set of instructions for causing the computer to perform any one or more of the methodologies discussed herein may be executed.

FIG. 6 is a block diagram of a computer in the example form of a processing system 600 within which a set of instructions for causing the computer to perform any one or more of the methodologies discussed herein may be executed. In alternative example embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The computer is capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The example of the processing system 600 includes one or more processors, such as a processor 602 (e.g., a central processing unit (CPU), a graphics processing unit (GPU) or both), a main memory 604, and static memory 606, which communicate with each other via bus 608. The processing system 600 may further include a video display unit 610 (e.g., a plasma display, a liquid crystal display (LCD) or a cathode ray tube (CRT)). The processing system 600 also includes an alphanumeric input device 612 (e.g., a keyboard), a user interface (UI) navigation device, such as cursor control device 614 (e.g., a mouse), a disk drive unit 616, a signal generation device 618 (e.g., a speaker), and a network interface device 620.

The disk drive unit 616 includes a computer or machine-readable medium 622 on which is stored one or more sets of instructions 624 and data structures (e.g., software) embodying or utilized by any one or more of the methodologies or functions described herein. The instructions 624 may also reside, completely or at least partially, within the main memory 604 and/or within the processor 602 during execution thereof by the processing system 600, with the main memory 604 and the processor 602 also constituting computer-readable, tangible media. The instructions 624 may further be transmitted or received over the network 626 via the network interface device 620 utilizing any one of a number of well-known transfer protocols (e.g., HTTP).

In accordance with some of these example embodiments, the computer-readable medium may store instructions for execution by one or more of the processors to manage server power consumption of a server system based on one or more server management policies by configuring the processors to determine an amount of excess processing capability and an amount of excess physical memory based on target server power consumption. The processors may be further configured to transition one or more processor cores of the server system and one or more memory modules of the server system to a lower-operational state while retaining functionality of the server system.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the example embodiment(s). In general, structures and functionality presented as separate components in the exemplary configurations may be implemented as a combined structure or component. Similarly, structures and functionality presented as a single component may be implemented as combined components. These and other variations, modifications, additions, and improvements fall within the scope of the example embodiment(s).

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

What is claimed is:

1. A server power manager that operates within a server system that includes a plurality of multi-core processors and a plurality of memory modules, the server power manager configured to:
   implement one or more server management policies that identify at least one of target server power consumption and target functionality for the server system;
   determine at least one of an amount of excess processing capability and an amount of excess physical memory based on the target server power consumption and the target functionality;
   transition at least one processor core of the plurality of multi-core processors to a lower-operational state when at least a predetermined amount of excess processing capability is determined while maintaining server system functionality during the transition; and
   transition at least one memory module of the plurality of memory modules to a lower-operational state when at least a predetermined amount of excess physical memory is determined while maintaining server system functionality during the transition,
   wherein during the lower-operational state of a processor core, the server power manager is configured to either disable clock signals to the processor core or induce a lower power functionally-active state with at least one of slower clock signals and reduced voltage levels,
   wherein during the lower-operational state of a memory module, the server power manager is configured to either disable clock signals or instruct the memory module to enter an auto-refresh state, and
   wherein to transition a processor core to the lower-operational state, the server power manager is configured to request a virtual machine monitor (VMM) or an operating system to:
      migrate processes away from the processor core and refrain from scheduling further processes on the processor core;
      flush cache hierarchy and translation lookaside buffers of the processor core; and
      ensure that the processor core is not a target of system interrupts.

2. The server power manager of claim 1 wherein the server power manager is further configured to access processor utilization information and memory utilization information from the operating system or the virtual machine monitor (VMM) of the server system to determine the amount of excess processing capability and the amount of excess physical memory, and
   wherein the at least one processor core and the at least one memory module remain active to retain functionality of the server system.

3. The server power manager of claim 2 wherein:
   at least one of the memory modules that are transitioned to the lower-operational state is disabled, and/or
   at least one of the processor cores that are transitioned to the lower-operational state is disabled.

4. The server power manager of claim 1 wherein the server management policies include one or more of:
   a time-of-day policy in which the server power manager is configured to reduce power consumption of the server system during one or more predetermined times on a daily or weekly basis;
   a power consumption reduction policy in which the server power manager is configured to reduce power consumption of the server system based on unused capacity of the server system;
   a data center maximum power consumption policy in which the server power manager is configured to reduce power consumption of the server system when power consumption of a data center approaches a maximum value to cap a maximum power consumption of the data center; and
   an application response time power consumption policy in which the server power manager is configured to maintain a threshold power consumption level to at least meet server application response times of service level agreements.

5. The server power manager of claim 1 wherein the server power manager is further configured to:
   receive requests from a data center management system to reduce power consumption of the server system based on one or more of the server management policies; and
   determine the target server power consumption and the target functionality based on one or more of the server management policies.

6. The server power manager of claim 5 wherein the server power manager is configured to receive a request from the data center management system to either partially restore or fully restore system functionality, and
   wherein in response to the request, the server power manager is configured to transition the at least one processor core from the lower-operational state to a fully-operational state and the at least one memory module from the lower-operational state to a fully-operational state.

7. The server power manager of claim 1 wherein the server power manager is further configured to:
   select processor cores of the plurality of multi-core processors to transition to the lower-operational state based on the amount of excess processing capability determined; and
   select memory modules of the plurality of memory modules to transition to the lower-operational state based on the amount of excess physical memory determined.

8. A server power manager that operates within a server system that includes a plurality of multi-core processors and a plurality of memory modules, the server power manager configured to:
   implement one or more server management policies that identify at least one of target server power consumption and target functionality for the server system;

determine at least one of an amount of excess processing capability and an amount of excess physical memory based on the target server power consumption and the target functionality;

transition at least one processor core of the plurality of multi-core processors to a lower-operational state when at least a predetermined amount of excess processing capability is determined while maintaining server system functionality during the transition; and transition at least one memory module of the plurality of memory modules to a lower-operational state when at least a predetermined amount of excess physical memory is determined while maintaining server system functionality during the transition, wherein during the lower-operational state of a processor core, the server power manager is configured to either disable clock signals to the processor core or induce a lower power functionally-active state with at least one of slower clock signals and reduced voltage levels, wherein during the lower-operational state of a memory module, the server power manager is configured to either disable clock signals or instruct the memory module to enter an auto-refresh state, and wherein to transition a memory module to the lower-operational state, the server power manager is configured to:
request a virtual memory (VM) system to reserve an amount of physical memory, to provide a reserved physical memory address space; and
declare the reserved physical memory address space unavailable to the VM system.

9. A method of managing power of a server system that includes a plurality of multi-core processors and a plurality of memory modules, the method comprising:
implementing one or more server management policies that identify at least one of target server power consumption and target functionality for the server system;
determining at least one of an amount of excess processing capability and an amount of excess physical memory based on the target server power consumption and the target functionality;
transitioning at least one processor core of the plurality of multi-core processors to a lower-operational state when at least a predetermined amount of excess processing capability is determined while maintaining server system functionality during the transition; and
transitioning at least one memory module of the plurality of memory modules to a lower-operational state when at least a predetermined amount of excess physical memory is determined while maintaining the server system functionality during the transition,
during the lower-operational state of a processor core, either disabling clock signals to the processor core or inducing a lower power functionally-active state with at least one of slower clock signals and reduced voltage levels,
during the lower-operational state of a memory module, either disabling clock signals or instructing the memory module to enter an auto-refresh state, and
wherein the transitioning of the at least one processor core to the lower operational state comprises requesting a virtual machine monitor (VMM) or an operating system to:
migrate processes away from the processor core and refrain from scheduling further processes on the processor core;
flush cache hierarchy and translation lookaside buffers of the processor core; and
ensure that the processor core is not a target of system interrupts.

10. The method of claim 9 further comprising maintaining operational functionality of at least some of the processor cores that are transitioned to the lower-operational state.

11. A server system that includes a plurality of multi-core processors, a plurality of memory modules, a virtual-machine monitor (VMM) module and a server power manager module, wherein the server power manager module is configured to instruct the VMM module to:
implement one or more server management policies that identify at least one of target server power consumption and target functionality for the server system;
determine at least one of an amount of excess processing capability and an amount of excess physical memory based on the target server power consumption and the target functionality;
transition at least one processor core of the plurality of multi-core processors to a lower-operational state when at least a predetermined amount of excess processing capability is determined while maintaining server system functionality during the transition; and
transition at least one memory module of the plurality of memory modules to a lower-operational state when at least a predetermined amount of excess physical memory is determined while maintaining the server system functionality during the transition,
wherein, during the lower-operational state of a processor core, the server power manager module is configured to either disable clock signals to the processor core or induce a lower power functionally-active state with at least one of slower clock signals and reduced voltage levels,
wherein during the lower-operational state of a memory module, the server power manager module is configured to either disable clock signals or instruct the memory module to enter an auto-refresh state, and
wherein to transition a processor core to the lower-operational state, the server power manager module is configured to request the VMM module or an operating system to:
migrate processes away from the processor core and refrain from scheduling further processes on the processor core;
flush cache hierarchy and translation lookaside buffers of the processor core; and
ensure that the processor core is not a target of system interrupts.

12. The server of claim 11 wherein the server is configured to maintain operational functionality of at least some of the processor cores that are transitioned to the lower-operational state.

13. A non-transient computer-readable storage medium that stores instructions for execution by one or more processors to manage power of a server system by:
implementing one or more server management policies that identify at least one of target server power consumption and target functionality for the server system, the server system including a plurality of multi-core processors and a plurality of memory modules;
determining at least one of an amount of excess processing capability and an amount of excess physical memory based on the target server power consumption and the target functionality;

transitioning at least one processor core of the plurality of multi-core processors to a lower-operational state when at least a predetermined amount of excess processing capability is determined while maintaining server system functionality during the transition; and transitioning at least one memory module of the plurality of memory modules to a lower-operational state when at least a predetermined amount of excess physical memory is determined while maintaining the server system functionality during the transition, during the lower-operational state of a processor core, either disabling clock signals to the processor core or inducing a lower power functionally-active state with at least one of slower clock signals and reduced voltage levels, during the lower-operational state of a memory module, either disabling clock signals or instructing the memory module to enter an auto-refresh state, and wherein the transitioning of the at least one processor core to the lower operational state comprises requesting a virtual machine monitor (VMM) or an operating system to:
  migrate processes away from the processor core and refrain from scheduling further processes on the processor core;
  flush cache hierarchy and translation lookaside buffers of the processor core; and
  ensure that the processor core is not a target of system interrupts.

14. The non-transient computer-readable storage medium of claim 13 wherein the server system is configured to maintain operational functionality of at least some of the processor cores that are transitioned to the lower-operational state.

15. A method of managing power of a server system that includes a plurality of multi-core processors and a plurality of memory modules, the method comprising:
  implementing one or more server management policies that identify at least one of target server power consumption and target functionality for the server system;
  determining at least one of an amount of excess processing capability and an amount of excess physical memory based on the target server power consumption and the target functionality;
  transitioning at least one processor core of the plurality of multi-core processors to a lower-operational state when at least a predetermined amount of excess processing capability is determined while maintaining server system functionality during the transition; and
  transitioning at least one memory module of the plurality of memory modules to a lower-operational state when at least a predetermined amount of excess physical memory is determined while maintaining server system functionality during the transition,
  during the lower-operational state of a processor core, either disabling clock signals to the processor core or inducing a lower power functionally-active state with at least one of slower clock signals and reduced voltage levels,
  during the lower-operational state of a memory module, either disabling clock signals or instructing the memory module to enter an auto-refresh state, and
  wherein the transitioning of a memory module to the lower-operational state comprises:
    requesting a virtual memory (VM) system to reserve an amount of physical memory, to provide a reserved physical memory address space; and
    declaring the reserved physical memory address space unavailable to the VM system.

16. A non-transient computer-readable storage medium that stores instructions for execution by one or more processors to manage power of a server system by:
  implementing one or more server management policies that identify at least one of target server power consumption and target functionality for the server system, the server system including a plurality of multi-core processors and a plurality of memory modules;
  determining at least one of an amount of excess processing capability and an amount of excess physical memory based on the target server power consumption and the target functionality;
  transitioning at least one processor core of the plurality of multi-core processors to a lower-operational state when at least a predetermined amount of excess processing capability is determined while maintaining server system functionality during the transition; and
  transitioning at least one memory module of the plurality of memory modules to a lower-operational state when at least a predetermined amount of excess physical memory is determined while maintaining server system functionality during the transition,
  during the lower-operational state of a processor core, either disabling clock signals to the processor core or inducing a lower power functionally-active state with at least one of slower clock signals and reduced voltage levels,
  during the lower-operational state of a memory module, either disabling clock signals or instructing the memory module to enter an auto-refresh state, and
  wherein the transitioning of a memory module to the lower-operational state comprises:
    requesting a virtual memory (VM) system to reserve an amount of physical memory, to provide a reserved physical memory address space; and
    declaring the reserved physical memory address space unavailable to the VM system.

17. A server system that includes a plurality of multi-core processors, a plurality of memory module and a server power manager module, wherein the server power manager module is configured to instruct the VMM module to:
  implement one or more server management policies that identify at least one of target server power consumption and target functionality for the server system;
  determine at least one of an amount of excess processing capability and an amount of excess physical memory based on the target server power consumption and the target functionality;
  transition at least one processor core of the plurality of multi-core processors to a lower-operational state when at least a predetermined amount of excess processing capability is determined while maintaining server system functionality during the transition; and
  transition at least one memory module of the plurality of memory modules to a lower-operational state when at least a predetermined amount of excess physical memory is determined while maintaining server system functionality during the transition,
  wherein during the lower-operational state of a processor core, the server power manager module is configured to either disable clock signals to the processor core or induce a lower power functionally-active state with at least one of slower clock signals and reduced voltage levels, wherein during the lower-operational state of a memory module, the server power manager module is configured to either disable clock signals or instruct the memory module to enter an auto-refresh state, and wherein to transition a memory module to the lower-operational state, the server power manager module is configured to:
- request a virtual memory (VM) system to reserve an amount of physical memory, to provide a reserved physical memory address space; and
- declare the reserved physical memory address space unavailable to the VM system.

* * * * *